(12) United States Patent
Ichikawa et al.

(10) Patent No.: US 8,615,402 B2
(45) Date of Patent: *Dec. 24, 2013

(54) METHOD AND SYSTEM FOR DISTRIBUTING DISASTER INFORMATION

(75) Inventors: Keiichi Ichikawa, Tokyo-to (JP); Yukio Ohtsuki, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,423

(22) Filed: Feb. 27, 2012

(65) Prior Publication Data

US 2012/0158418 A1 Jun. 21, 2012

Related U.S. Application Data

(62) Division of application No. 10/102,344, filed on Mar. 20, 2002, now Pat. No. 8,160,891.

(30) Foreign Application Priority Data

Mar. 22, 2001 (JP) .................................. 2001-083891

(51) Int. Cl.
*G06Q 99/00* (2006.01)

(52) U.S. Cl.
USPC ......................................................... 705/1.1

(58) Field of Classification Search
USPC ......................................................... 705/1.1
See application file for complete search history.

(56) References Cited

U.S. PATENT DOCUMENTS

| | | | |
|---|---|---|---|
| 5,990,805 A | 11/1999 | Wicks et al. | |
| 6,023,223 A | 2/2000 | Baxter, Jr. | |
| 6,462,665 B1 | 10/2002 | Tarlton et al. | |
| 6,654,689 B1 | 11/2003 | Kelly et al. | |
| 6,886,045 B1 | 4/2005 | Halasz et al. | |
| 7,058,710 B2 | 6/2006 | McCall et al. | |
| 2002/0138298 A1 | 9/2002 | Ichikawa et al. | |

FOREIGN PATENT DOCUMENTS

| | | |
|---|---|---|
| JP | 09-054895 | 2/1997 |
| JP | 11-053668 | 2/1999 |
| JP | 11-110454 | 4/1999 |
| JP | 11-285053 | 10/1999 |
| JP | 2000-148719 | 5/2000 |
| JP | 2001-053906 | 2/2001 |

OTHER PUBLICATIONS

RescueNow.net, Inc., "Crisis Management Information Portable Transmission Service", (http://www.rescuenow.net/press/news/000828myresq.html), English Translation, 6 pages (Aug. 28, 2000).

(Continued)

*Primary Examiner* — Traci Casler
(74) *Attorney, Agent, or Firm* — Ronald A. Kaschak; Kevin P. Radigan, Esq.; Heslin Rothenberg Farley & Mesiti P.C.

(57) ABSTRACT

A system and method to distribute disaster information to a customer. An information distribution apparatus for distributing disaster information to a customer terminal includes a disaster information storage for storing disaster-occurred district information for identifying a disaster-occurred district in which a disaster has occurred and a real disaster level corresponding to the disaster selected from a plurality of preset disaster levels; a customer information registration unit for registering customer district information; a distribution information management unit for deciding whether the disaster information is distributed to the customer by collating the disaster-occurred district with the customer district with respect to the disaster level; and an information distribution unit for distributing disaster information to the terminal according to a decision of the distribution information management unit.

9 Claims, 14 Drawing Sheets

(56) References Cited

OTHER PUBLICATIONS

PC Web, "By portable telephone crisis management, start 'of my rescue' service", (http://pcweb.mycom.co.jp/cgi-bin/print?id-2261), English Translation, 2 pages (Aug. 28, 2000).
Ichikawa et al., Office Action for U.S. Appl. No. 10/102,344 (U.S. Patent Publication No. 2002/0138298 A1), dated Sep. 22, 2006.
Ichikawa et al., Final Office Action for U.S. Appl. No. 10/102,344 (U.S. Patent Publication No. 2002/0138298 A1), dated Feb. 28, 2007.
Ichikawa et al., Advisory Action for U.S. Appl. No. 10/102,344 (U.S. Patent Publication No. 2002/0138298 A1), dated May 16, 2007.
Ichikawa et al., Office Action for U.S. Appl. No. 10/102,344 (U.S. Patent Publication No. 2002/0138298 A1), dated Aug. 9, 2007.
Ichikawa et al., Final Office Action for U.S. Appl. No. 10/102,344 (U.S. Patent Publication No. 2002/0138298 A1), dated Jan. 15, 2008.
Ichikawa et al., Advisory Action for U.S. Appl. No. 10/102,344 (U.S. Patent Publication No. 2002/0138298 A1), dated Apr. 21, 2008.
Ichikawa et al., Restriction Requirement for U.S. Appl. No. 10/102,344 (U.S. Patent Publication No. 2002/0138298 A1), dated Aug. 7, 2008.
Ichikawa et al., Office Action for U.S. Appl. No. 10/102,344 (U.S. Patent Publication No. 2002/0138298 A1), dated Nov. 21, 2008.
Ichikawa et al., Final Office Action for U.S. Appl. No. 10/102,344 (U.S. Patent Publication No. 2002/0138298 A1), dated Jun. 8, 2009.
Ichikawa et al., Appeal Brief for U.S. Appl. No. 10/102,344 (U.S. Patent Publication No. 2002/0138298 A1), dated Oct. 15, 2009.
Ichikawa et al., Examiner's Answer to Appeal Brief for U.S. Appl. No. 10/102,344 (U.S. Patent Publication No. 2002/0138298 A1), dated Dec. 18, 2009.
Ichikawa et al., BPAI Decision on Appeal for U.S. Appl. No. 10/102,344 (U.S. Patent Publication No. 2002/0138298 A1), dated Nov. 1, 2011.
Ichikawa et al., Notice of Allowance for U.S. Appl. No. 10/102,344 (U.S. Patent Publication No. 2002/0138298 A1), dated Dec. 13, 2011.

| STATE | CITY | TOWN | CATEGORY | LV | DETAIL |
|---|---|---|---|---|---|
| TOKYO | MINATO-WARD | ROPPONGI 3-CHOME | FIRE REPORT | 2 | EXPLOSION & FIRE ON 13TH FLOOR |
| KANGAWA PREF. | FUJISAWA CITY | KIRIHARA-CHO | FIRE REPORT | 3 | SMALL FIRE IN WAREHOUSE |
| HOKKAIDO | ASAHIKAWA CITY | - | WEATHER INFORMATION | 2 | HEAVY SNOWFALL WARNING |
| AKITA PREF. | OGA CITY | - | EARTHQUAKE INFORMATION | 1 | SEISMIC INTENSITY 5 |
| ⋮ | ⋮ | ⋮ | ⋮ | ⋮ | ⋮ |

| CUSTOMER | STATE | CITY | TOWN | COURSE |
|---|---|---|---|---|
| X | TOKYO | MINATO-WARD | ROPPONGI | A |
| Y | TOKYO | MINATO-WARD | DAIMON | A |
| Z | TOKYO | MINATO-WARD | ROPPONGI | B |
| ⋮ | ⋮ | ⋮ | ⋮ | ⋮ |

MACHINE TABLE

COURSE A

|  | LV1 | LV2 | LV3 |
|---|---|---|---|
| TOWN | O | O | O |
| CITY | O | O |  |
| STATE | O |  |  |
| ALL | O |  |  |

COURSE B

|  | LV1 | LV2 | LV3 |
|---|---|---|---|
| TOWN | O |  |  |
| CITY | O |  |  |
| STATE | O |  |  |
| ALL | O |  |  |

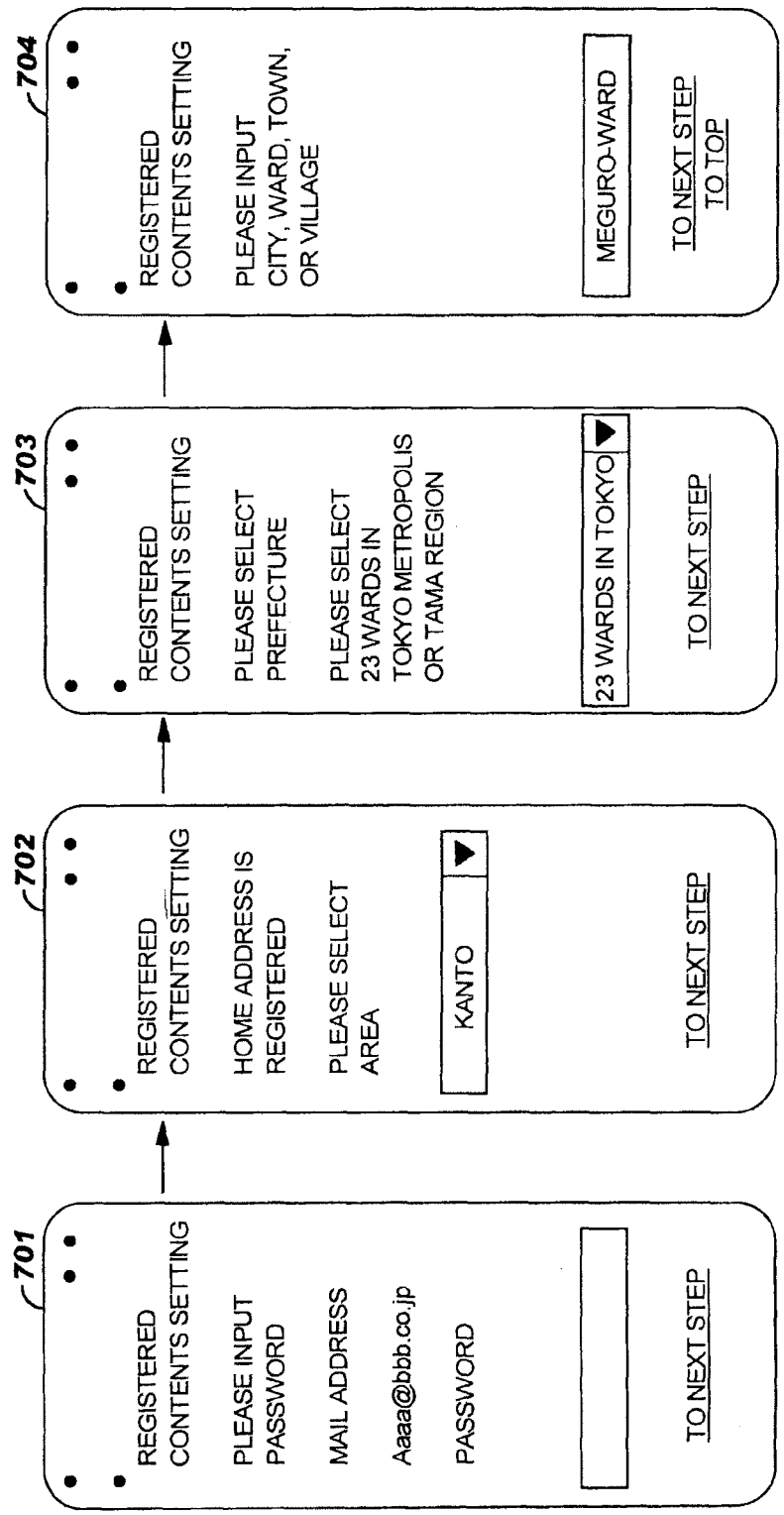

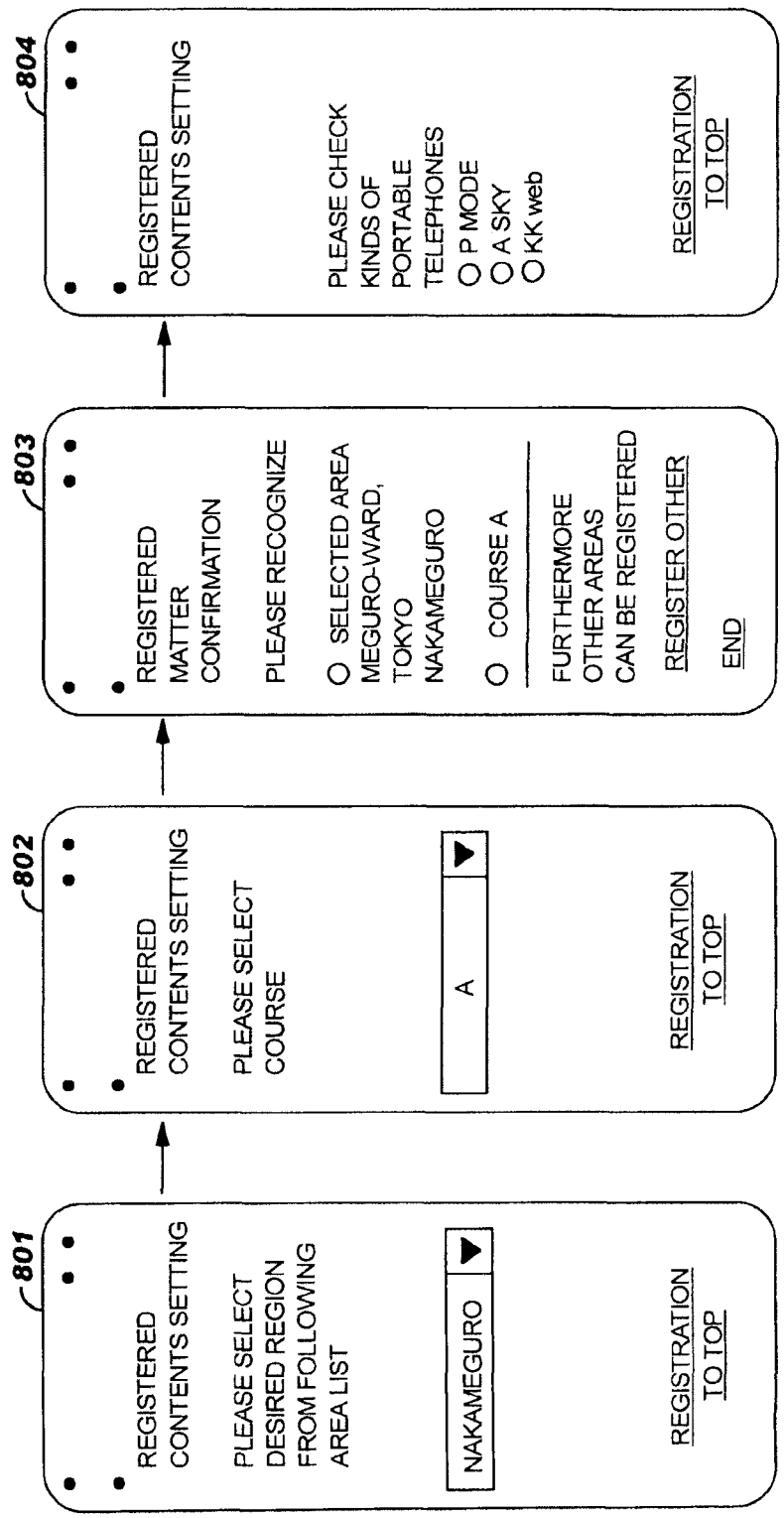

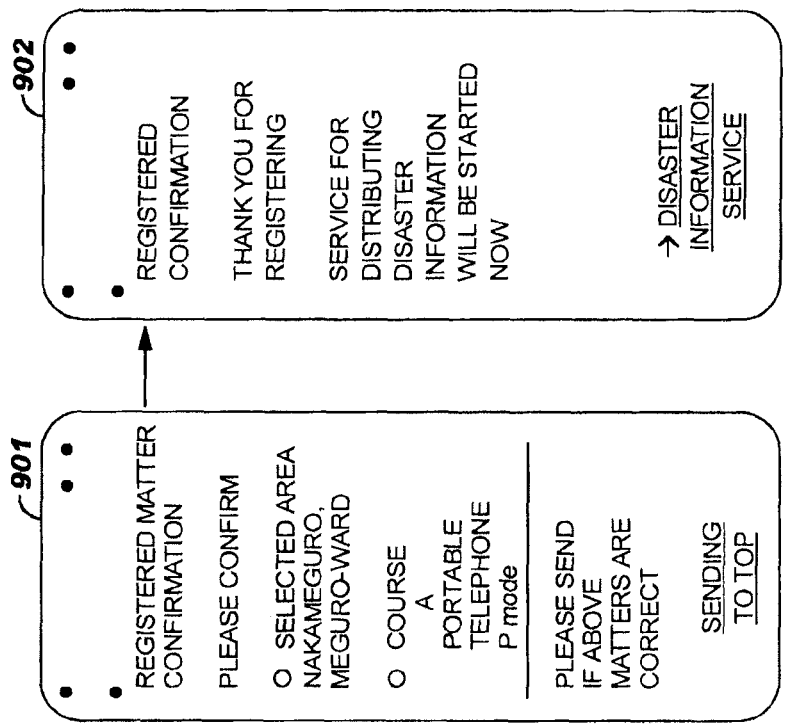

FIG. 11

| CATEGORY | RAILWAY | STATION1 | STATION2 | LV | DETAIL |
|---|---|---|---|---|---|
| TRAIN BREAKDOWN/ ACCIDENT | YAMANOTE LINE | SHIBUYA | HARAJUKU | 3 | DOOR TROUBLE |
| TRAIN BREAKDOWN/ ACCIDENT | CHUO LINE | KUNITACHI | KUNITACHI | 1 | INJURY/DEATH ACCIDENT |
| TRAIN BREAKDOWN/ ACCIDENT | TOKYU TOYOKO LINE | TORITSU DAIGAKU | GAKUGEI DAIGAKU | 2 | ACCIDENT AT CROSSING |
| TRAIN BREAKDOWN/ ACCIDENT | TOKAIDO SHINKANSEN | MAIHARA | KYOTO | 2 | POWER FAILUER |
| ⋮ | ⋮ | ⋮ | ⋮ | ⋮ | ⋮ |

FIG. 12

| CUSTOMER | STATE | CITY | TOWN | COURSE |
|---|---|---|---|---|
| X | TOKYO | MINATO-WARD | ROPPONGI | A |
| Y | TOKYO | MINATO-WARD | DAIMON | A |
| Z | TOKYO | MINATO-WARD | ROPPONGI | B |
| ⋮ | ⋮ | ⋮ | ⋮ | ⋮ |

FIG. 13

| TOKYU TOYOKO LINE |
|---|
| ⋮ |
| MEGURO-WARD TOKYO |
| SHIBUYA-WARD TOKYO |
| ⋮ |
| YOKOHAMA CITY KANAGAWA PREF |
| ⋮ |
| YAMANOTE LINE |
| |
| CHIYODA-WARD TOKYO |
| ⋮ |
| MEGURO-WARD TOKYO |
| SHIBUYA-WARD TOKYO |
| ⋮ |
| ⋮ |
| |
| ⋮ |

METHOD AND SYSTEM FOR DISTRIBUTING DISASTER INFORMATION

CROSS-REFERENCE TO RELATED APPLICATIONS

This application is a division of U.S. patent application Ser. No. 10/102,344, filed Mar. 20, 2002, and entitled "Method and System for Distributing Disaster Information," and which was published on Sep. 26, 2002 as U.S. Patent Publication No. US 2002/0138298 A1, and which is assigned to the same assignee as this application, and which is hereby incorporated herein by reference in its entirety.

FIELD OF THE INVENTION

The present invention relates to a system for distributing information via such a network as an Internet, more particularly to a system for distributing disaster information to customers.

BACKGROUND

Disaster information must be shared quickly by all the concerned people. At present, such disaster information is distributed to people by mass media. However, enabling people to share any kind of information related to disaster is one of today's most urgent issues.

The Internet is an effective tool for distributing information. However, using the Internet to distribute disaster information would not be effective, as mass disaster information would be distributed to people without distinction. Consequently, people might receive so much information that truly necessary information could be lost. Furthermore, receiving so much information might cause people to lose their interest and become insensitive even to disaster information.

Disaster information covers a spectrum ranging from ordinary disasters such as fires, weather-caused (heavy rains, lightning, snowfalls, and so forth) damages, railway accidents, and traffic accidents, through more serious natural disasters (earthquakes, eruptions, tsunamis (seismic sea waves), typhoons, and so forth) that occur only once in many years. It is therefore important not to let people overlook really necessary disaster information among a mass of information they might receive. When an existing Internet system is employed for distributing such disaster information, however, it is required to set conditions for registering customers so as to receive disaster information one by one. For example, conditions to be set could become complicated as follows. When a disaster occurs far away, what information do customers want to have? Do they need railway operation information and/or weather reports? When a disaster occurs in the neighborhood, what scale disaster information do they receive? Do they want information about small fires, traffic accidents, as well? Actually, there is no need to set the conditions in such detail, as conditions will be set coarsely so as to distribute mass information; existing systems cannot distribute truly necessary information to individual customers.

BRIEF SUMMARY

An object of the present invention is to provide a system that can distribute necessary information to customers without requiring setting of complicated and troublesome conditions.

Customers refer to geographical information as a criterion so as to make their choices about disaster information they truly need. Typically, a customer requests minute disaster information when the disaster-stricken district is closer to him/her; conversely, the customer does not request any information about far-away disasters except when the disaster is serious in scale.

Table 1 shows disaster categories by assuming the X axis as a distance from the subject customer, the Y axis as a disaster level, and the Z axis as a disaster category. This table employs the first letters of Distance, disaster Level, and Category, so that it may be referred to as a DLC table.

In this DLC table, distance from a subject customer is usually a distance from the customer's home address. A slight disaster damage takes a lower level and a serious disaster damage takes a higher level. For an earthquake, for example, a level is decided by the seismic intensity (or magnitude denoting the energy of the earthquake). Disaster categories denote disaster types. For example, the table a denotes fires, the table b denotes earthquakes, the table c denotes hurricanes, and the table d denotes seismic waves. Such tables are prepared for each disaster category. The tables a to d described above are just examples. The number of tables may also be prepared in accordance with the number of other disasters.

The table a in the DLC table has a trapezoidal area, which denotes the relationship between the distance from each customer and each disaster level. When the distance from a customer is near, the customer wants to obtain the disaster information even when the disaster level is low. When the distance from the customer is far, however, the customer does not want any information about low level disasters. Thus, the trapezoidal area denotes such the customer's need of disaster information. Consequently, in the case where this area is defined as a distribution set area and disaster information included in this area is distributed to a customer, it will be effective to satisfy the customer's desire for obtaining disaster information. And, the DLC table enables the customer to obtain disaster information matching with the customer's need simply by selecting two elements: a district and a disaster level for each disaster category.

Basically, the present invention distributes disaster information on the basis of the concept employed for the DLC table. Consequently, the information distributor, at the time of storing disaster information in a data base, creates disaster information so as to include a disaster-occurred district, a disaster level, and a disaster category therein. On the other hand, the distribution service receiver (customer) sets his/her district. The information distributor then creates customer information including the district set by the customer. This is why the distributor can distribute disaster information appropriately to the customer's need just by collating this disaster information with the customer information under predetermined conditions updated by the DLC table.

In order to attain the above object, the information distribution apparatus of the present invention, enabled to distribute disaster information to a customer terminal, includes a disaster information storage for storing disaster-occurred district information for identifying a disaster-occurred district and a real disaster level corresponding to the disaster, selected from a plurality of preset disaster levels; a customer information registration unit for registering customer district information set by the customer; a distribution information management unit for deciding whether disaster information is distributed to the customer or not by collating the disaster-occurred district information with the customer district information with respect to the set disaster level matching with the real disaster level; and an information distribution unit for distributing disaster information to the customer terminal according to the decision by the distribution information management unit.

In the case of the information distribution apparatus of the present invention, the customer registers customer district information beforehand, and can receive disaster information matching with his/her need.

In the case of the information distribution apparatus of the present invention, the customer district information set by the customer is preferably divided into hierarchical layers before it is stored. Hierarchical division means, for example, the relationship between prefectures and municipalities. More concretely, it means the relationship between "Tokyo" and "Minato Ward" in Tokyo or "Kanagawa Prefecture" and "Fujisawa City" in the prefecture. The customer district information of the present invention is not limited only to such administrative units. Storing hierarchically divided district information in this way is intended to cope with customers' needs. The requests from customers do not depend on the disaster level; customers living in "Minato Ward" request distribution of disaster information related to disasters occurring in Minato Ward, but do not request distribution of disaster information about disasters occurring in other wards in "Tokyo". Consequently, the disaster information storage should preferably store the disaster-occurred district information divided in hierarchical layers, to provide more favorable collation of information by the distribution information management unit.

The information distribution apparatus of the present invention distributes disaster information to customer terminals via such a network as the Internet. The information distribution apparatus of the present invention does not limit the types of customer terminals, but they are preferably portable terminals, for example portable phones enabled to be connected to a network so as to receive disaster information effectively therefrom.

According to the present invention, the disaster information storage can store a disaster type corresponding to disaster-occurred district and each disaster level. When such information is stored in the storage, the distribution information management unit may decide whether to distribute information according to each disaster type or not. This is because there are many disaster types such as fires, weather-caused disasters, earthquakes, etc. as described above, and the decision must be made appropriately to each such disaster type.

Furthermore, in the case of the present invention, the disaster information storage should store disaster contents corresponding to the disaster-occurred district information and each real disaster level so as to enable the information distribution unit to distribute the disaster type, the disaster-occurred district information, and the disaster contents to subject customer terminals as disaster information.

As described above, the information distribution unit is used only to distribute disaster information. However, in addition to such disaster information, the concept of the present invention may also apply to the distribution of general information of events for which occurred-districts can be identified. Specifically, the concept of the present invention can apply to event information to be classified into nationwide information and local information, such as economic information, political information including elections, sports information, and so forth. The information distribution apparatus of the present invention obtains information about an event for which occurred-districts can be identified, so that the information may be distributed only to customers who satisfy predetermined conditions. In order to attain this objective, the information distribution apparatus includes an information distribution unit having a criterion for deciding whether information in relation to a disaster level in each of the hierarchically divided geographical units is distributed or not, and a customer information registration unit for registering customer district information set by the customer. The distribution information management unit, when it obtains new event information wherein the customer district information matches with the event-occurred district in any of the geographical units, decides whether information according to the criterion is distributed or not.

Basically, the information distribution apparatus decides whether information is distributed by comparing two geographical items while consideration is given to the event level.

In the information distribution apparatus of the present invention, the distribution information management unit may have a plurality of criteria, and sets quotation information for the criteria. The quotation information is used to quote each of the criteria. The customer information registration unit registers any of the quotation information items and the distribution information management unit can confirm the quotation information registered in the customer information registration unit so as to decide whether information according to the criterion corresponding to the confirmed quotation information is distributed or not. This is to cope with each event type, such as economic information, politic information including elections, sports information, and so forth.

Furthermore, in the information distribution apparatus of the present invention, the distribution information management unit, at the time of distributing event information to the customer, may distribute a questionnaire related to the event. For example, at the time of distributing disaster information, the distribution information management unit may solicit and receive the latest information about the disaster from a customer living in or around the disaster-occurred district so as to distribute the new information to another customer. The questionnaire preferably is prepared for each event separately.

Furthermore, in the information distribution apparatus of the present invention, the distribution information management unit, at the time of distributing the event information may communicate with the customers about payment of monetary gifts. This makes it possible to provide relief quickly to a customer who has suffered from a disaster.

The present invention may also apply to an information distribution apparatus that can cope with events that occur in such courses as roads, as described above. In such a case, the information distribution apparatus of the present invention is preferably be configured as follows. Specifically, the information distribution apparatus of the present invention, which obtains event information for which its occurred-district can be identified by course and distributes the event information to customers who satisfy predetermined conditions, includes a distribution information management unit having a criterion for deciding whether or not to distribute information in relation to a disaster level in each of hierarchically divided geographical units; a course-district conversion unit for converting event-occurred course information to information of a district that the course passes through; and customer information registration unit for registering customer district information set by each customer. The distribution information management unit, when it obtains new event information for which the geographical unit matches with the event-occurred district in any of the geographical units, decides whether or not information is distributed to the customer according to the criterion.

A district where a railway disruption occurs is identified by the course. However, although course information is a kind of disaster-occurred district information, it cannot be compared with the customer district information registered in the customer information registration unit unless modified. This is why the present invention converts course information to information of a district that the course passes through.

The information distribution apparatus of the present invention is also used to distribute to customers information of a disaster occurring in a predetermined district. The apparatus includes a customer information registration unit for registering customer district information set by each customer, a disaster information storage for storing the disaster-occurred district and the disaster level, and a distribution information management unit for deciding whether or not the disaster information is distributed to the customer by comparing the customer district information with the disaster-occurred district while consideration is given to the disaster level.

In the information distribution apparatus of the present invention, the distribution information management unit decides whether to distribute disaster information to the customer by comparing the distance from the customer district with that of the disaster-occurred district.

The present invention also provides an information distribution method for distributing to customers information of a disaster occurring in a predetermined district. The method includes: a step (a) of registering customer district information according to which the customer requests distribution of information; a step (b) of identifying the disaster-occurred district and the disaster level; and a step (c) of deciding whether to distribute the disaster information by considering the distance between the customer district and the disaster-occurred district, while consideration is given to the disaster level.

In the information distribution method of the present invention, the step (c) can decide to distribute the disaster information to the customer even when the disaster level is high and the customer district is far from the disaster-occurred district. This is to cope with the request from the customer who wants to obtain information of a serious disaster even when the disaster occurs far away.

Furthermore, the present invention enables the step (c) to decide to distribute the disaster information to the customer when the disaster level is low and the customer district matches the disaster-occurred district or is nearby.

The present invention also provides an information distribution method that includes: a step of storing disaster-occurred district information for identifying a disaster-occurred district and a real disaster level selected from a plurality of preset disaster levels and corresponding to the disaster; a step of registering customer district information set by the customer; and a step of deciding whether the disaster information is distributed to the customer terminal or not by collating the disaster-occurred district with the customer district information with respect to a set disaster level matching with the real disaster level; and a step of distributing the disaster information or not according to the decision.

Furthermore, the information distribution method of the present invention may be used to obtain information of an event for which its occurred-district can be identified and distribute the event information to a customer who satisfies predetermined conditions. The method includes: a step of preparing a criterion for deciding whether to distribute information to the customer in relation to an event level set in each of hierarchically divided geographical units; a step of registering customer district information set by the customer; and a step of deciding whether information is distributed to the customer or not according to the criterion when it obtains new event information and the customer district information matches with the event-occurred district in any of the geographical units.

Furthermore, the information distribution method of the present invention may be used to distribute information to a customer of a disaster occurring in a predetermined district. The method includes a step of registering customer district information set by the customer; a step of storing the disaster-occurred district and the disaster level; and a step of deciding whether or not the disaster information is distributed to the customer by comparing the customer district information with the disaster-occurred district while consideration is given to the disaster level.

Furthermore, the present invention provides a program that enables a computer to execute processes (a) for setting a customer district according to which the customer requests distribution of disaster information; (b) for identifying a disaster-occurred district and a disaster level; and (c) for deciding whether information is distributed to the customer or not by comparing the distance between the customer district and the disaster-occurred district while consideration is given to the disaster level.

BRIEF DESCRIPTION OF THE SEVERAL VIEWS OF THE DRAWINGS

FIG. 4 shows contents of a disaster information data base (DB) employed in the first embodiment of the present invention;

FIG. 5 shows contents of a customer information data base (DB) employed in the first embodiment of the present invention;

FIG. 6 shows contents of matching tables employed in the first embodiment of the present invention;

FIG. 7 shows a procedure for registering customer information employed in the first embodiment of the present invention;

FIG. 8 shows another procedure for registering customer information employed in the first embodiment of the present invention;

FIG. 9 shows still another procedure for registering customer information employed in the first embodiment of the present invention;

FIG. 11 shows contents of a disaster information data base (DB) employed in the first embodiment of the present invention;

FIG. 12 shows contents of a customer information data base (DB) employed in the first embodiment of the present invention;

FIG. 13 shows contents of a course-district conversion table employed in the first embodiment of the present invention;

DETAILED DESCRIPTION

Hereunder, various embodiments of the present invention will be described with reference to the accompanying drawings.

Figure 1:
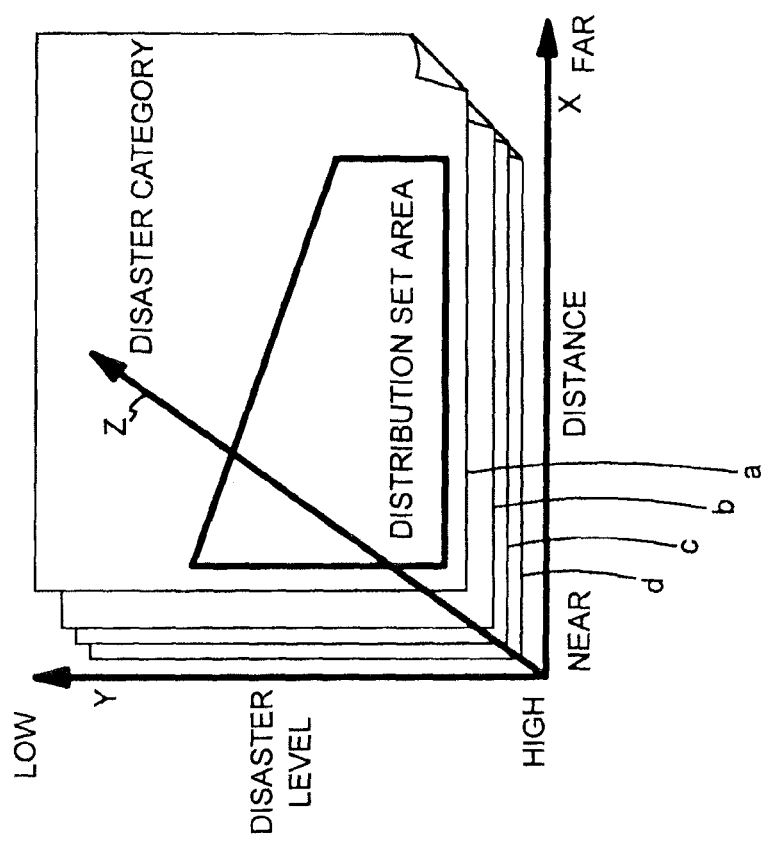
FIG. 1 shows disaster, level, category (DLC) table, in accordance with one or more aspects of the present invention.
Figure 2:
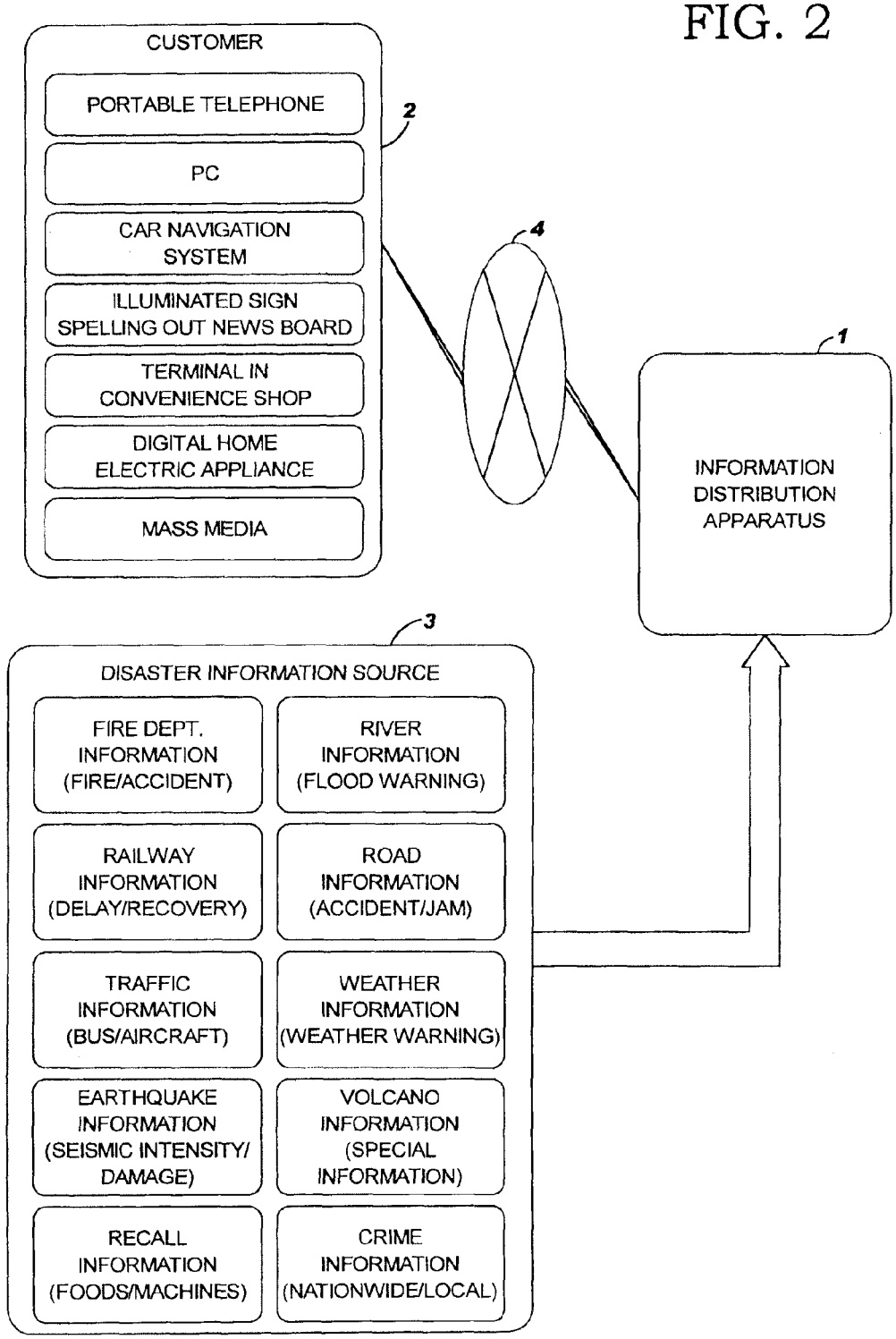
FIG. 2 is a schematic block diagram of a configuration of a disaster information distribution system employed in a first embodiment of the present invention.

FIG. 2 is a schematic block diagram for a configuration of a disaster information distribution system according to a first embodiment of the present invention. As shown in FIG. 2, the disaster information distribution system in this first embodiment includes an information distribution apparatus 1. The information distribution apparatus 1 obtains disaster information from a disaster information source 3. The information distribution apparatus 1 then customizes the obtained disaster information and distributes the customized disaster information to a customer 2.

The customer 2 can receive the disaster information from the information distribution apparatus 1 with use of a portable phone and/or a personal computer (PC) via, for example, the Internet 4, as well as via a car navigation system, an illuminated sign spelling-out news board, a terminal installed at a convenience store, a terminal such as a digital home appliance, and so forth.

The information distribution apparatus 1 obtains disaster information items from the disaster information source 3. For example, the disaster information source 3 may collect the following information items: fire information, river (flood) information, railway (accident) information, road (accident) information, traffic information, weather reports, earthquake information, volcano information, recall information, and crime information. The fire information may include fires and explosion accidents. The river information may include flood warnings. The railway information may include delay or recovery information. The road information may include car accidents and traffic jams. The weather information may include weather reports and various weather-caused disaster warnings and alarms, as well as the probability of precipitation. The earthquake information may include seismic intensity of each earthquake and damages of each earthquake. The volcano information may include eruption information. The recall information may include recall information of foods, machines, and other products available on the market. The information distributor obtains the disaster information items and stores them in data bases (to be described later) of the information distribution apparatus 1.

Figure 3:
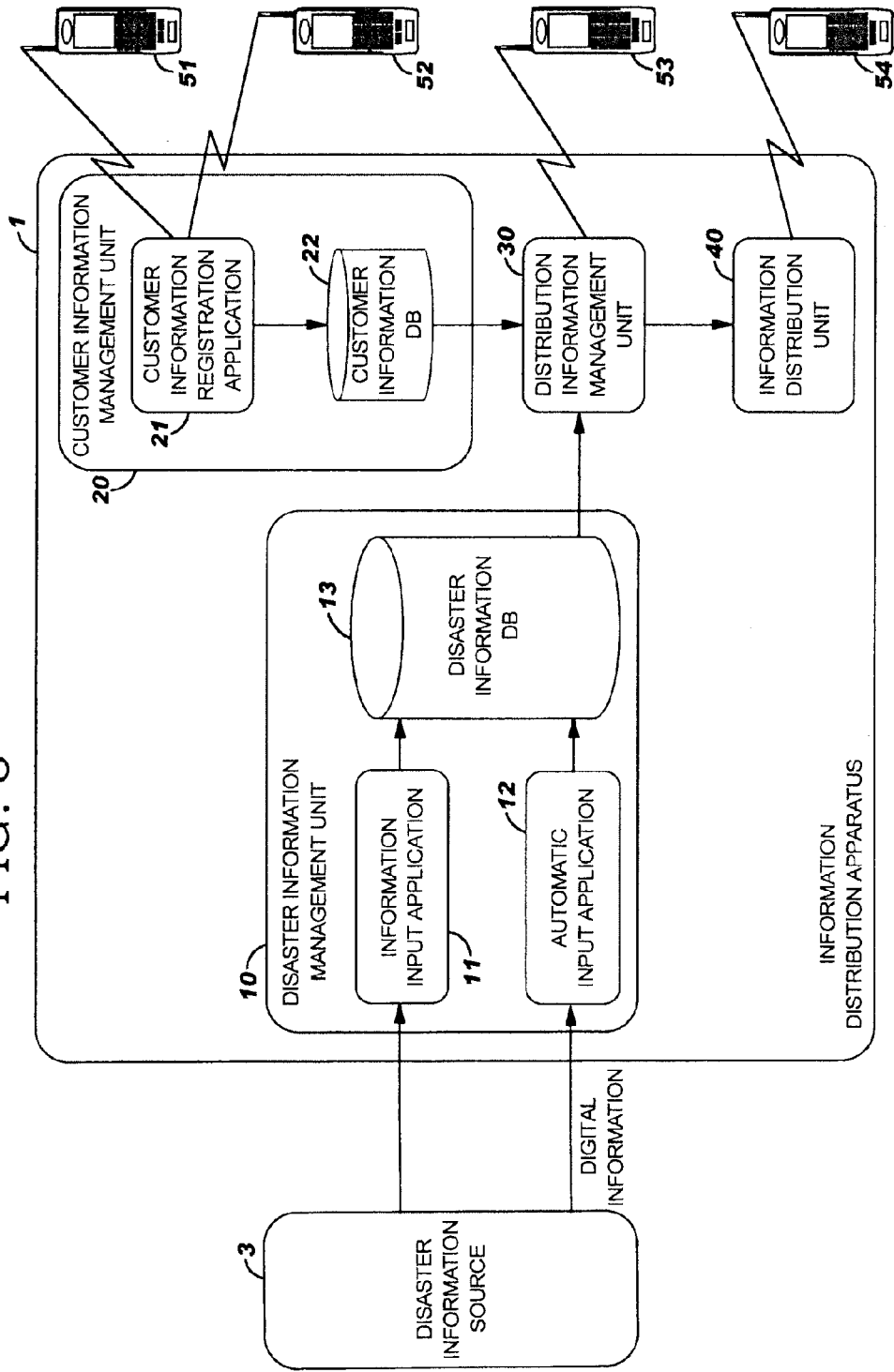
FIG. 3 is a block diagram of an information distribution apparatus employed in the first embodiment of the present invention.

FIG. 3 is a block diagram for a configuration of the information distribution apparatus 1. The system shown in FIG. 3 distributes disaster information to portable phones 51 to 54 of customers.

The information distribution apparatus 1 includes a disaster information management unit 10, a customer information management unit 20, a distribution information management unit 30, and an information distribution unit 40.

The disaster information management unit 10 includes an information input application program 11, an automatic input application program 12, and a disaster information data base (DB) 13.

The information input application 11 is used to enter disaster information obtained from the disaster information source 3 manually. The automatic input application 12 is used to enter disaster information obtained from the disaster information source 3 automatically as digital information. The disaster information entered from the information input application 11 and automatic input application 12 is stored in the disaster information data base (DB) 13.

The disaster information data base (DB) 13 stores disaster information classified by geographical information, disaster type, disaster level, and disaster content. FIG. 4 shows an exemplary record 400 of the disaster information data base (DB) 13. The geographical information is classified into three hierarchical layers: (STATE), (CITY), and (TOWN). As shown in FIG. 4, the "STATE" denotes such a prefecture as Tokyo, Hokkaido, and so forth. The "CITY" denotes such a city, town, or village of an administrative unit as Minato Ward, Fujisawa City, and so forth. The "TOWN" denotes a local area unit in a ward, city, town, or village, for example, Roppongi 3-chome, Kirihara-machi, and so forth. In FIG. 4, "CATEGORY" denotes information of a disaster type. Specifically, it may be a fire report, a weather report, an earthquake report, and so forth. In FIG. 4, "LV" denotes a disaster level. This level means one of three ranks (1 to 3) for each disaster type ("CATEGORY"). In the first embodiment, "1" denotes a serious disaster damage, "2" denotes a medium disaster damage, and "3" denotes a slight disaster damage. "DETAIL" in FIG. 4 means information denoting descriptive specifics of a disaster, for example, "explosion and fire outbreak on 13th floor of a building", "fire outbreak in a warehouse", and so forth. The disaster information stored in the disaster information data base (DB) 13 may be updated each time disaster information is obtained from the disaster information source 3. Each time the disaster information data base (DB) 13 is updated, the new disaster information may be transferred to the distribution information management unit 30.

The customer information management unit 20 is provided with a customer information registration application program 21 and a customer information DB 22. The customer information registration application 21 assists each customer to register his/her information in the customer information DB 22 so as to receive services from this system. Customer information may be registered in the customer information DB 22 in the format of an exemplary record 500 as shown in FIG. 5.

In FIG. 5, "CUSTOMER" denotes information used to identify each customer. The example shown in FIG. 5 includes information about three customers, denoted X, Y, and Z. A mail address used for a portable phone may be set for "CUSTOMER". Each customer information is registered with respect to hierarchically divided geographical information ("STATE", "CITY" and "TOWN") and "COURSE" information. The geographical information means customer district information set by each customer. A home address can be set as the customer district information. In this case, FIG. 5 shows that the home address of the customer X is Roppongi, Minato-Ward, Tokyo, the home address of the customer Y is Daimon, Minato-Ward, Tokyo, and the home address of the customer Z is Roppongi, Minato-Ward, Tokyo. A customer pays his/her highest attention to information about disasters that occur in his/her district including his/her home address. In FIG. 5, "COURSE" may be selected from two choices A and B. A specific selection example will be described later.

The distribution information management unit 30 receives new disaster information from the disaster information data base (DB) 13. Receiving new disaster information, the distribution information management unit 30 executes a process for matching the disaster information with each customer information registered in the customer information DB 22. As a result of this matching process, customers are selected to whom the new disaster information is to be distributed. The distribution information management unit 30 is provided with matching tables used for the matching processing. A matching table may be prepared for each disaster information type, that is, for each "CATEGORY". Such a matching table may also be prepared for each course in each "CATEGORY".

FIG. 6 shows an example of a matching table 600 for a fire outbreak report. A matching table is configured by two tables: a first table 601 for course A, and a second table 602 for course B.

The matching table 600 is used to link hierarchically divided geographical information with disaster level and decide whether to distribute disaster information customers. Hereinafter, exemplary contents of the matching table for course A are described. Disaster information whose level LV is 3 is distributed to the subject customer(s) only when "TOWN" in the disaster information transferred from the distribution information management unit 30 matches "TOWN" in the customer information obtained from the customer information DB 22. The "o" in the matching table denotes that information should be distributed. Disaster information whose level LV is 2 is distributed to the subject customer(s) when "CITY" in the disaster information transferred from the distribution information management unit 30 matches "CITY" in the customer information obtained from the customer information DB 22. In this case, even when the "TOWN" does not match between that transferred from the distribution information management unit 30 and that obtained from the customer information DB 22, the disaster information is distributed to the subject customer(s). Disaster information whose level LV is 1 is distributed to the subject customer(s) when "STATE" in the disaster information transferred from the distribution information management unit 30 matches "STATE" in the customer information obtained from the customer information DB 22. In this case, even when both "TOWN" and "CITY" do not match between that transferred from the distribution information management unit 30 and that obtained from the customer information DB 22, the disaster information is distributed to the subject customer(s). "ALL" in the matching table means that information should be distributed even when all "STATE", "CITY", and "TOWN" do not match between that transferred from the distribution information management unit 30 and that obtained from the customer information DB 22. This is a case in which disaster information is distributed even when a district denoted by customer district information is far from a disaster-occurred district. The same rules also apply to the matching table for course B.

The information distribution unit 40 distributes disaster information, according to decisions made by the distribution information management unit 30, to predetermined customers as mail information. The customers receive this information via portable phones 51 to 54. In this first embodiment, as shown in FIG. 2, disaster information is distributed to the portable phones 51 to 54 of the customers via the Internet. Thus, the portable phones 51 to 54 must be portable phones that can communicate with the Internet. The communication method of each of the portable phones differs among carriers (portable phone companies), so that the information distribution unit 40 must distribute disaster information appropriately to the communication method of each of the portable phones 51 to 54.

A customer who wants to use the disaster information distribution service of the first embodiment is asked to register himself/herself via a portable telephone 51 as shown in FIG. 3. Hereinafter, the customer registration procedure will be described with reference to FIGS. 7 through 9.

When the customer accesses the information distribution apparatus 1 via the portable telephone 51, a password input screen 701 is displayed as shown in FIG. 7. The customer is requested to enter his/her password on the password input screen 701. The password input screen 701 also displays the mail address assigned to the portable telephone 51. When the customer sends the entered password, a home address input screen 702 is displayed. The customer is prompted to select his/her area such as Kanto, Tokai, and so forth on the home input screen 702. In this case, the customer selects Kanto in the example shown in FIG. 7. Then, there appears a prefecture selection screen 703 for prompting the customer to select his/her prefecture. In this example, the customer selects 23 Wards in Tokyo. Then, there appears a city selection screen 704 for prompting the customer to select his/her city, ward, town, or village. In this example, the customer selects Meguro Ward. After this, there appears a detail selection screen 801 for prompting the customer to select his/her more detailed area in the selected ward as shown in FIG. 8. This completes the registration of the information related to his/her home address.

Then, there appears a course selection screen 802 for prompting the customer to select a course, as shown in FIG. 8. The customer is requested to select either A or B. In this example the customer selects the course A. After this course selection, there appears a confirmation screen 803 for prompting the customer to confirm the registered items. On the confirmation screen 803 are displayed "Nakameguro, Meguro-Ward, Tokyo" as the selected area and "A" as the selected course as shown in FIG. 8. The confirmation screen 803 also prompts the customer to register other areas; for example, it is also possible to register the home address of his/her parents, the address of his/her place of work, and so forth on this screen.

Then, there appears a phone registration screen 804 for prompting the customer to register the type of the portable telephone 51 as shown in FIG. 8. On the screen phone registration 804 are displayed three types of portable telephones. The customer is prompted to select one of them. When the customer selects the type of the portable telephone, there appears another confirmation 901 screen for prompting the customer to confirm the type of the portable telephone he/she has entered. When the customer sends "confirmed", there appears a registration confirmation screen 902 for displaying the "registration confirmed" message as shown in FIG. 9.

Next, a description will be made for the details of a matching process executed by the distribution information management unit 30 with reference to FIG. 10.

Figure 10:
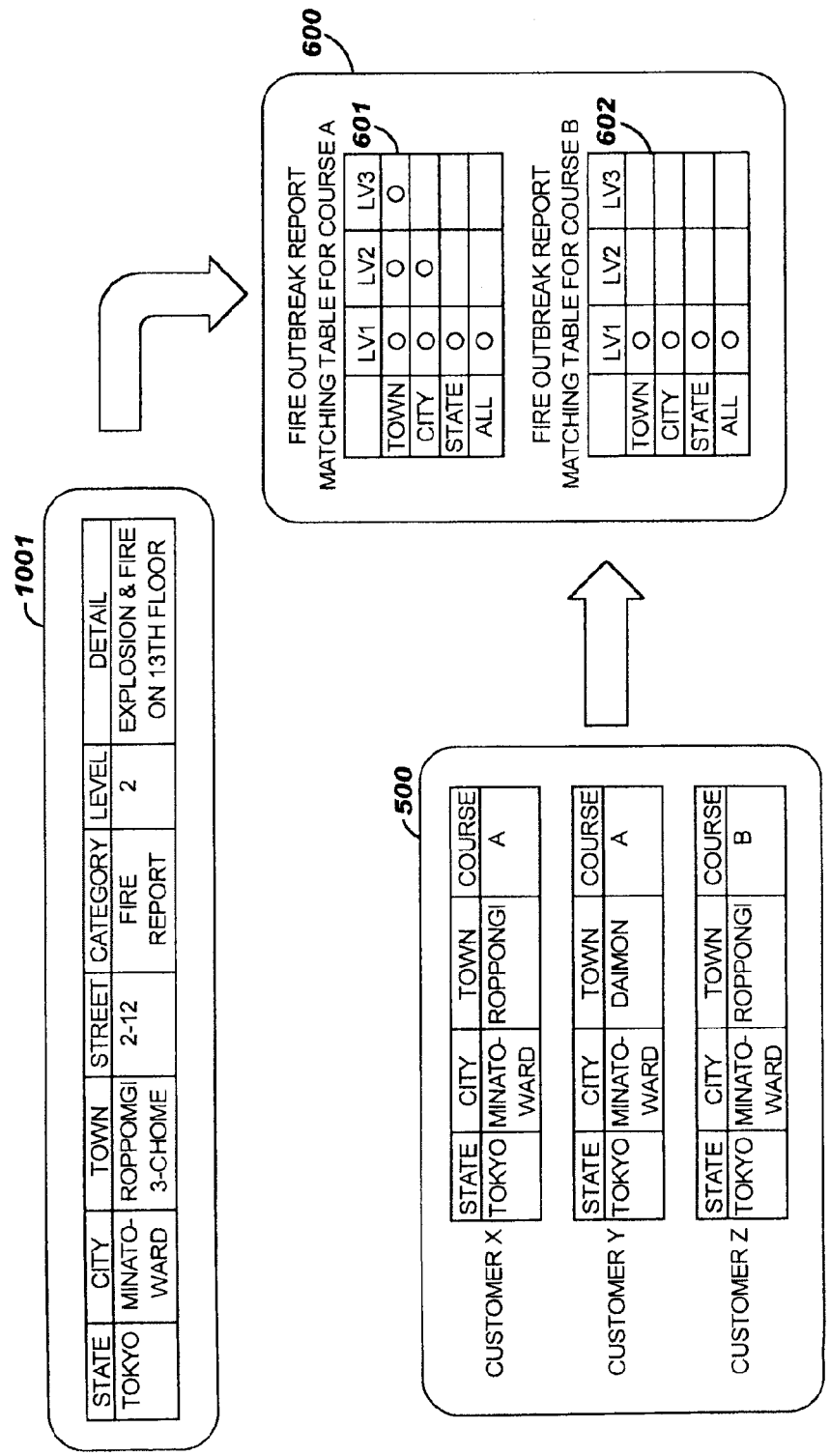
FIG. 10 shows exemplary logic employed in the first embodiment of the present invention.

FIG. 10 shows a procedure for deciding whether to distribute disaster information to three customers X, Y, and Z shown as users in FIG. 5, with reference to the matching table 600 shown in FIG. 6, when an explosion and fire occur in Roppongi, and which is newly registered in the disaster information DB 13. The explosion and fire is selected from the disaster information items shown in FIG. 4.

The distribution information management unit 30 obtains the disaster information from the disaster information DB 13 and the customer information from the customer information DB 22 respectively. In the exemplary record 1001 shown in FIG. 10, the disaster information denotes "Tokyo", "Minato-Ward", "Roppongi", "LV=2", and "Fire report" respectively.

Figure 15:
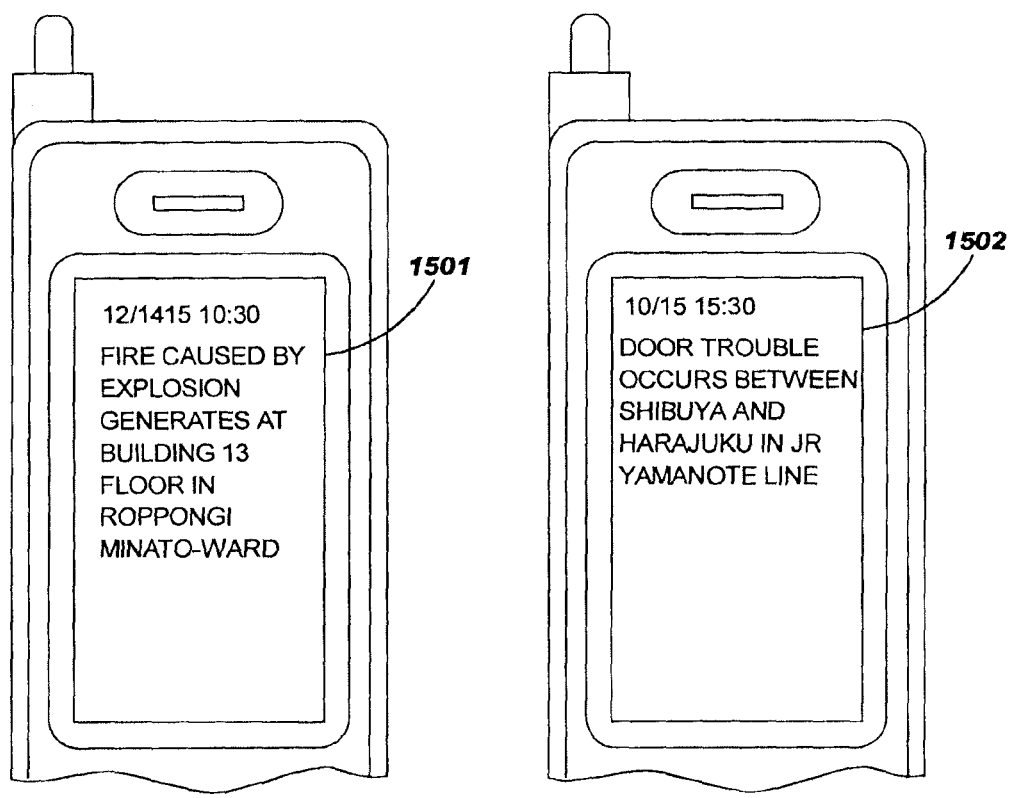
FIG. 15 shows exemplary screens shown on a customer's portable telephone employed in the first embodiment of the present invention.

The customer X has selected the course A, so the disaster information is collated with the customer information in the matching table 601 for the course A. Because LV=2, the LV2 column in the matching table 601 is checked. The customer information "CITY" denotes "Minato-Ward", which matches with "CITY", and a circle (o) is described in the "CITY" field of the LV2 column in the matching table. The (o) means that the information should be distributed. This disaster information is thus distributed to the customer X. FIG. 15 shows an example of a screen 1501 for displaying the information distributed to the customer's portable telephone 53.

The customer Y has selected the course A. Therefore, the matching table 601 for the course A is used for a matching processing just like the customer X. The "TOWN" of the customer Y denotes "Daimon", which differs from the disaster information "TOWN". However, "CITY", which is just one level above "TOWN", matches with "Minatoku". In addition, for the course A, the information of LV2 of "CITY" must be distributed. This disaster information is thus distributed to the customer Y.

The customer Z has selected the course B. Thus, the disaster information is collated with the customer information in the matching table 602 for the course B. Because LV=2, the LV2 column in the matching table 602 is checked. In the case of the customer information of the customer Z, because "CITY" is "Minato-Ward" and "TOWN" is "Roppongi", both "CITY" and "TOWN" in the disaster information match with those registered for the customer. However, no circle (o) is described in the LV2 field in the matching table 602 for the course B. The circle (o) means that the disaster information should be distributed. Therefore, this disaster information is not distributed to the customer Z.

As described above, in a sense, the matching process is a process for comparing customer district information with a disaster-occurred district while consideration is given to the disaster level. This comparison may be considered as a comparison of distance between customer district information and a disaster-occurred district. For example, when both "TOWN" items match with each other, the distance is close. On the other hand, when both "STATE" items match with each other, but "TOWN" items differ, the distance may be far.

As described above, the present invention also handles railway information such as train breakdowns/accidents as disaster information. In the case of railway information, the geographical information of a disaster is identified by the railway course and/or the railway station in which the disaster occurs. Consequently, it is inconvenient to use the information about the railway course and/or the station in the matching processing with reference to the matching table shown in FIG. 6. It is thus helpful to convert a railway course to geographical information.

FIG. 11 shows an exemplary record 110D of disaster information related to a railway and stored in the disaster information DB 13. Disaster information related to a railway is classified into "CATEGORY" denoting a disaster type, "RAILWAY" denoting a railway course on which the subject disaster has occurred, and "STATION 1" and "STATION 2" denoting station(s) in which the subject disaster has occurred. The reason why there are two stations "STATION 1" and "STATION 2" stored in the data base is due to a possibility that a disaster may occur between two stations. When a fire breaks out in a station yard, station names denoted in "STATION 1" and "STATION 2" match with each other. "LV" denotes a disaster level. "DETAIL" denotes the nature of a disaster.

In the example shown in FIG. 11, "CATEGORY" denotes only a train trouble/accident. The disaster information described in the top row of the exemplary record 1101 denotes a door trouble that has occurred between Shibuya Station (STATION 1") and Harajuku Station ("STATION 2") of the Yamanote Line ("RAILWAY"). The disaster information also denotes that the disaster level of this door trouble is 3(LV), which means a slight trouble. The disaster information described in the next row denotes an accident resulting in injury or death occurred in the Kunitachi station yard ("STATION 1" and "STATION 2"="Kunitachi") of the Chuosen ("RAILWAY"); the disaster level is 1.

The customer information stored in the customer information DB 22 is also used for matching with respect to train troubles/accidents. However, the disaster information to be used for the matching with respect to such train troubles/accidents can be limited more strictly than that of other disaster information. FIG. 12 shows an exemplary record 1200 that includes "STATE", "CITY", and "COURSE" in customer information used for matching for train troubles/accidents.

While both course and station are identified for railway information as described above, this kind of information cannot be used conveniently for matching geographical information stored as customer information. This is why course information is converted to geographical information. The distribution information management unit 30 is provided with a course-district conversion table 1300 as shown in FIG. 13. The course-district conversion table 1300 includes information about districts passed by each subject course. The district is set as geographical information equivalent to "CITY" in customer information. Specifically, as shown in FIG. 13, for the Toyoko Line, Meguro-Ward, Shibuya-Ward, Yokohama City, etc. that are passed by the Toyoko Line are described. As for the JR Yamanote Line, Chiyoda-Ward, Meguro-Ward, Shibuya-Ward, and so forth that are passed by the Yamanote Line are described. The course-district conversion table 1300 describes geographical information of districts for each course and to be passed by each course.

The distribution information management unit 30 also has a matching table whose format is the same as that shown in FIG. 10. The description will therefore be omitted here.

Next, a description will be made for the matching process executed for railway information with reference to FIG. 14.

Figure 14:
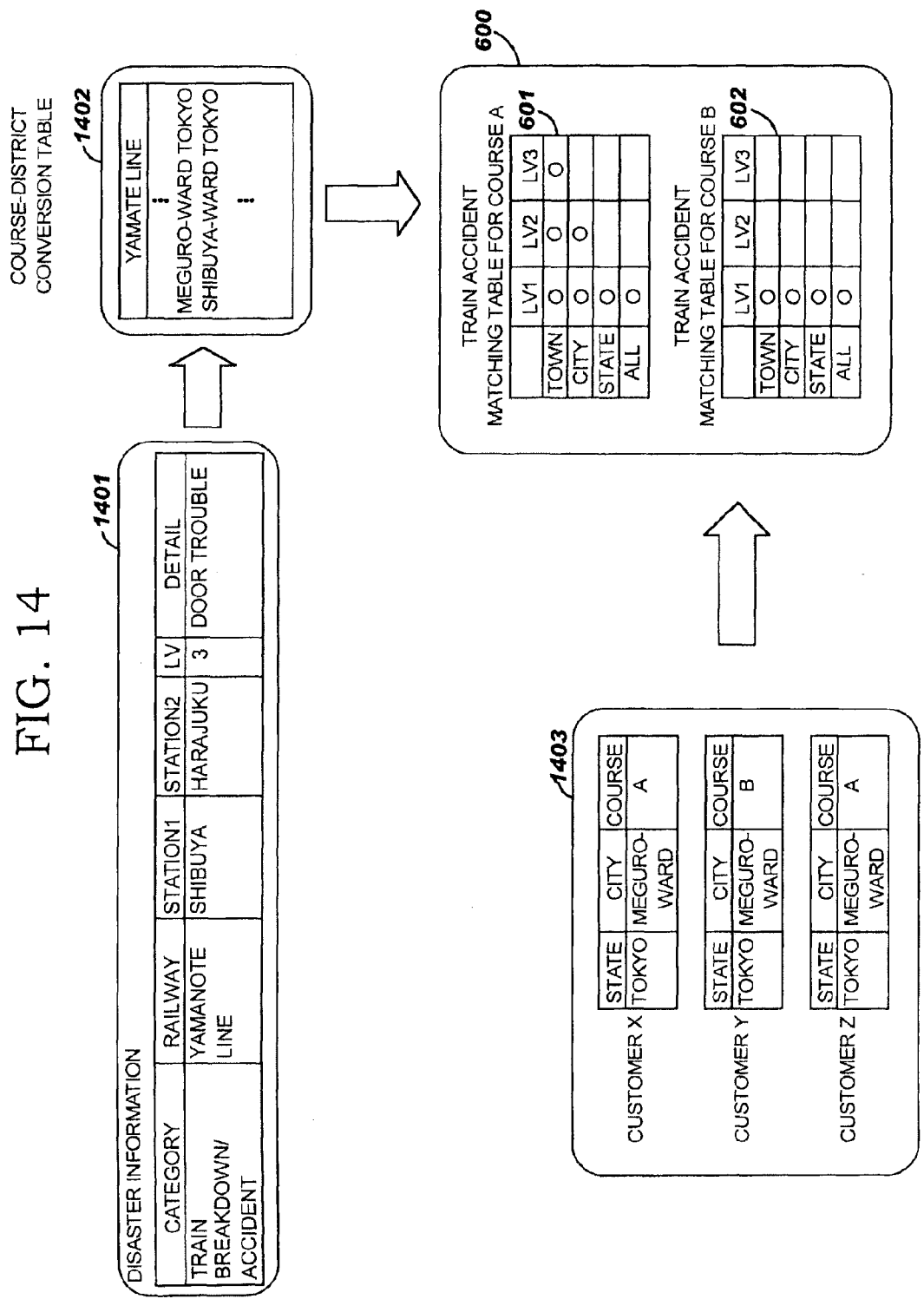
FIG. 14 shows exemplary logic employed in the first embodiment of the present invention.

FIG. 14 shows an example of a procedure for deciding whether to distribute disaster information to the three customers X, Y, and Z shown in FIG. 12 with reference to the matching table 600 when door trouble occurs in the Yamanote Line and the trouble is selected from the disaster information items 1401 also shown in FIG. 11 so as to be registered newly in the disaster information DB 13.

The course information 1402 included in the disaster information transferred to the distribution information management unit 30 from the disaster information DB 13 is converted to geographical information by the course-district conversion table 1300. Specifically, "Yamanote Line" in the "RAILWAY" column is converted to the geographical information of Shibuya-Ward, Meguro-Ward, . . . by the course-district conversion table 1300.

As shown in the exemplary records 1403, customer X has selected the course A. Thus, the disaster information is collated with the customer information in the matching table 601 for the course A. Because the disaster level LV of the train trouble/accident is 3, the LV3 column in the matching table 601 is checked. In the LV3 column and in the "CITY" and "TOWN" rows in the matching table 601 are described a circle (o) respectively, which means that the disaster information should be distributed. "CITY" in the customer information of the customer X is Meguro-Ward. On the other hand, the Yamanote Line is converted to Meguro-Ward, Shibuya-Ward, . . . by the course-district conversion table 1300. "CITY" thus matches disaster information and customer information, so that the disaster information is distributed to the customer X. FIG. 15 shows an example of a screen 1502 for displaying information distributed to the portable telephone 53 of the customer X.

Customer Y has selected the course B. Thus, the matching table 602 for the course B is checked. In the matching table 602 for the course B, LV3 disaster information is marked not to be distributed. Consequently, the disaster information is not distributed to the customer Y.

The customer Z has selected the course A. The disaster information and the customer information are thus collated with each other in the matching table 601 for the course A. Because "CITY" of the customer Z is Shibuya-Ward and "CITY" matches between disaster information and customer information just like the customer X, so that the disaster information is distributed to the customer Z.

In the above first embodiment, predetermined disaster information is distributed from the information distribution apparatus 1 to the customer's portable telephone 53/54. In the case where the customer who receives the disaster information is in the disaster-occurred district at the time of the disaster, it is possible to obtain disaster information such as descriptive details from the customer. This is why the present invention proposes a method not only for distributing disaster information to the customer's portable telephone 53/54, but also for obtaining disaster information from the customer through a questionnaire.

Figure 16:
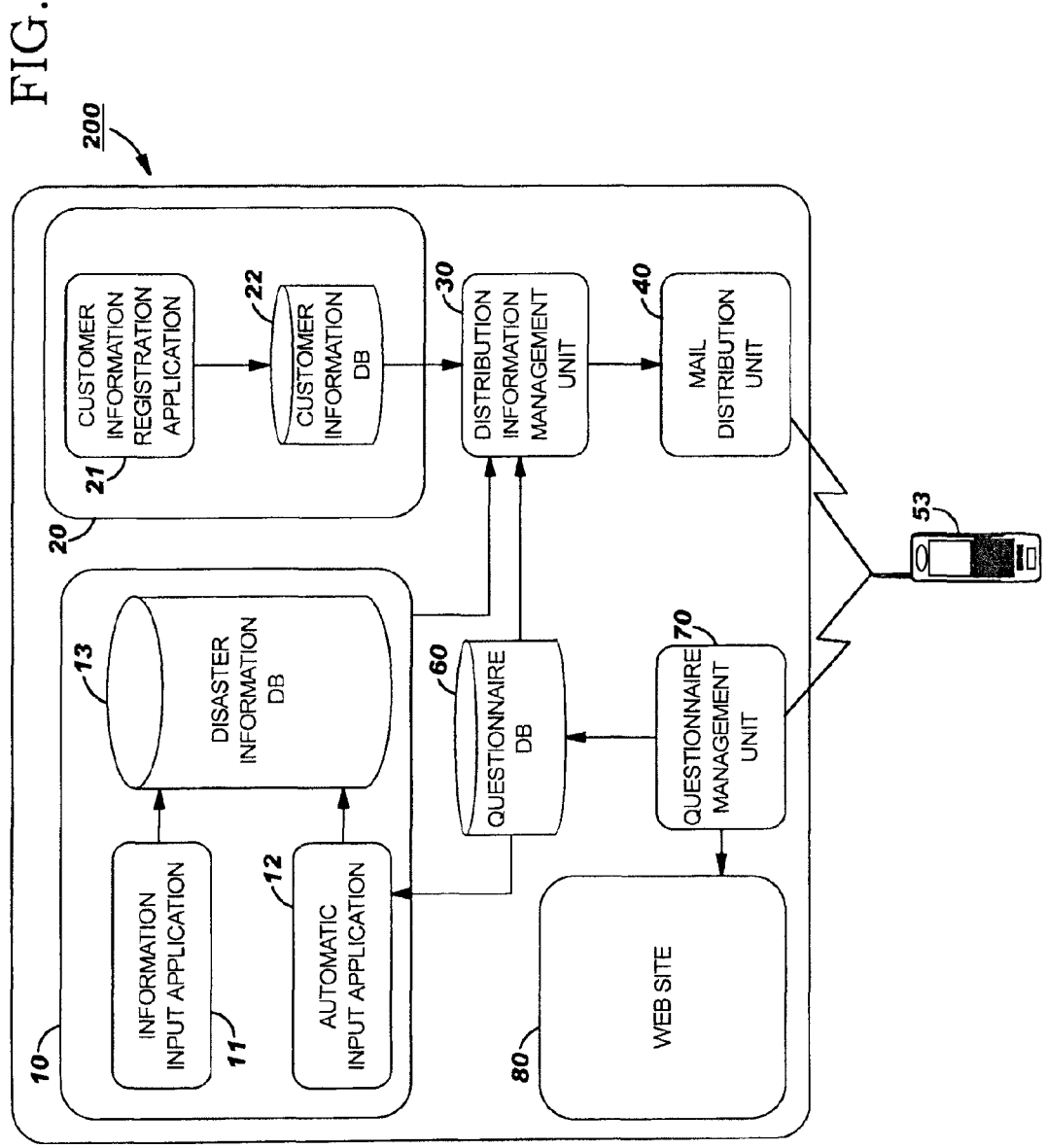
FIG. 16 is a block diagram of a configuration of an information distribution apparatus employed in a second embodiment of the present invention.

FIG. 16 shows a block diagram of a configuration of an information distribution apparatus 200 used so as to obtain disaster information from a customer. The same reference numerals are used for the same items as those of the information distribution apparatus 1 in the first embodiment, avoiding redundant description.

The information distribution apparatus 200 is provided with a questionnaire DB (data base) 60; a questionnaire management unit 70; and a WEB site 80.

Figure 18:
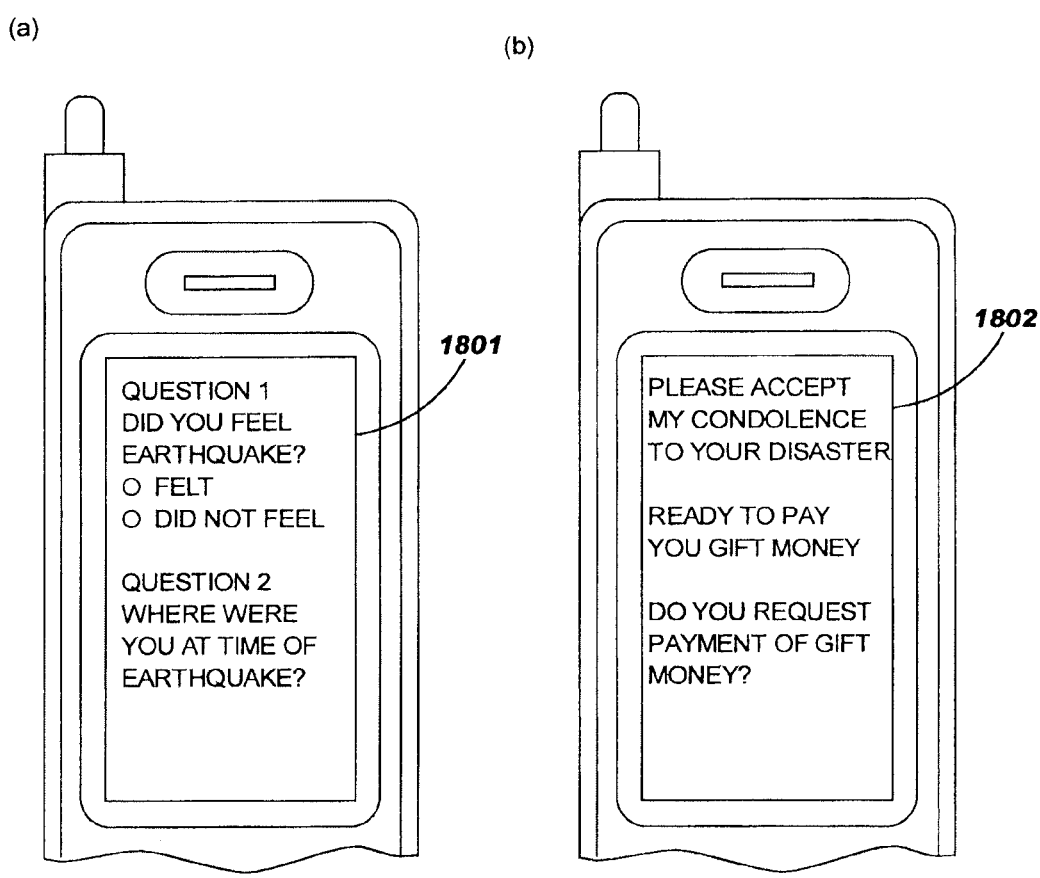
FIG. 18 shows exemplary screens displayed for a customer's portable telephone employed in the second and third embodiments of the present invention.

The questionnaire DB 60 stores various questionnaires corresponding to disaster types. When the distribution information management unit 30 distributes disaster information to a customer's portable telephone 53, the distribution information management unit 30 may obtain a questionnaire corresponding to the disaster type from the questionnaire DB 60 and distribute it to the portable telephone 53. FIG. 18 shows an example of a questionnaire screen 1801 sent to the portable telephone 53. In this example, the questionnaire is distributed together with earthquake information.

The questionnaire management unit 70 collects answers to the questionnaires about disaster information and analyzes them. The result of the analysis is then transferred to the questionnaire DB 60 and stored there. The questionnaire result is also displayed on the screen of the WEB site 80. Customers can thus obtain detailed information about a disaster by referring to this WEB site 80.

The information stored in the questionnaire DB 80 is then transferred to the disaster information DB 13 via an automatic input application program 12. This information can be distributed to customers as new disaster information.

A third embodiment of the present invention includes a system for paying a monetary gift to a customer who suffers from a disaster, using the information distribution system.

Figure 17:
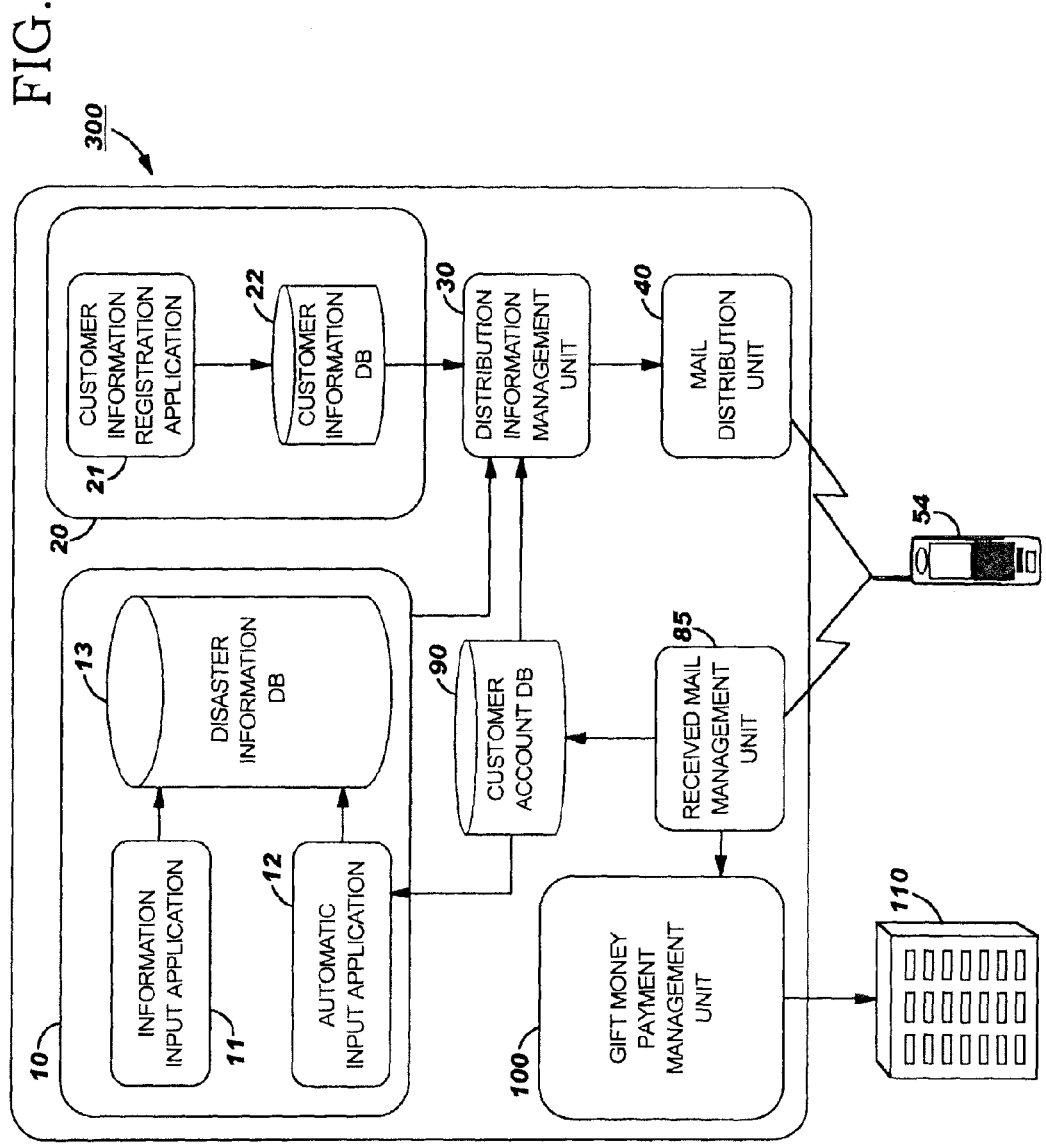
FIG. 17 is a block diagram of a configuration of an information distribution apparatus employed in a third embodiment of the present invention.

FIG. 17 shows a block diagram of a configuration of an information distribution apparatus 300 that pays such a gift of money. In the following description of the third embodiment, the same reference numerals are used to indicate the same items as earlier regarding the first embodiment, thereby avoiding redundant description.

The information distribution apparatus 300 is provided with a received mail management unit 85; a customer account DB (data base) 90; and a gift money payment management unit 100.

The distribution information management unit 30 of the information distribution apparatus 300, for example, when distributing disaster information, sends inquiries to customers about payment of monetary gifts. FIG. 18 shows an example of a screen 1802 for such inquiries. A customer who desires to receive a gift may reply to this inquiry.

The received mail management unit 85 receives mail for requesting gift money via the customer's portable telephone 53. The received mail management unit 85, when receiving mail for requesting gift money, transfers information for identifying the source customer, for example, a mail address, to the gift money payment management unit 100.

The customer account DB 90 stores such information as the mail address for identifying each customer corresponding to the account set in a bank or other financial institution 110 registered beforehand by the customer requesting the gift.

The gift money payment management unit 100, when receiving a mail address from the received mail management unit 85, obtains the information from the customer account DB 90 so as to identify the account of the customer. In addition, the gift money payment management unit 100 transfers gift money to the financial institution 110 in which the account is opened.

While preferred embodiments of the present invention have been described, the present invention is not limited only to those embodiments. For example, information to be distributed is not limited only to disaster information; the present invention may apply universally to information of a disaster for which its occurred-district can be identified.

What is claimed is:

1. An information distribution method for distributing information related to a disaster occurred in a disaster-occurred district to a customer, comprising:
utilizing an information distribution apparatus in distributing information related to said disaster, said utilizing comprising:
pre-setting customer district information according to which said customer requests distribution of information, said pre-setting including selecting a matching table of a plurality of matching tables, each matching table of the plurality of matching tables indicating multiple conditions to be met before disaster information is to be forwarded to customers selecting that matching table, the multiple conditions comprising at least one geographic condition of a plurality of geographic conditions and at least one disaster level condition of a plurality of disaster level conditions;
receiving disaster-occurred information and identifying a disaster-occurred district and a level of said disaster;
using the customer selected matching table in deciding whether to distribute information related to said disaster to said customer based on the at least one geographic condition compared with said disaster-occurred district and the at least one disaster level condition compared with said disaster level;
distributing to said customer said disaster information responsive to the deciding that both the at least one geographic condition and the at least one disaster level condition are met by the disaster; and
wherein said disaster relates to a railway course.

2. The information distribution method of claim 1, wherein the information distribution apparatus further comprises a course-district conversion table which includes information on geographical districts passed by the railway course, and wherein the identifying said disaster-occurred district comprises employing said course-district conversion table to identify from said disaster-occurred information said disaster-occurred district.

3. The information distribution method of claim 2, wherein the course-district conversion table comprises a railway course affected by the disaster, and a first station and a second station denoting stations in which or between which the disaster has occurred.

4. A computer system for facilitating distributing information related to a disaster occurred in a disaster-occurred district to a customer, the computer system comprising:
 a memory; and
 a processor in communications with the memory, wherein the computer system is configured to perform a method, the method comprising:
  pre-setting customer district information according to which said customer requests distribution of information, said pre-setting including selecting a matching table of a plurality of matching tables, each matching table of the plurality of matching tables indicating multiple conditions to be met before disaster information is to be forwarded to customers selecting that matching table, the multiple conditions comprising at least one geographic condition of a plurality of geographic conditions and at least one disaster level condition of a plurality of disaster level conditions;
  receiving disaster-occurred information and identifying a disaster-occurred district and a level of said disaster;
  using the customer selected matching table in deciding whether to distribute information related to said disaster to said customer based on the at least one geographic condition compared with said disaster-occurred district and the at least one disaster level condition compared with said disaster level;
  distributing to said customer said disaster information responsive to the deciding that both the at least one geographic condition and the at least one disaster level condition are met by the disaster; and
  wherein said disaster relates to a railway course.

5. The computer system of claim 4, wherein the information distribution apparatus further comprises a course-district conversion table which includes information on geographical districts passed by the railway course, and wherein the identifying said disaster-occurred district comprises employing said course-district conversion table to identify from said disaster-occurred information said disaster-occurred district.

6. The computer system of claim 5, wherein the course-district conversion table comprises a railway course affected by the disaster, and a first station and a second station denoting stations in which or between which the disaster has occurred.

7. A computer program product for facilitating distributing information related to a disaster occurred in a disaster-occurred district to a customer, the computer program product comprising:
 a computer-readable storage medium readable by a processing circuit and storing instructions for execution by the processing circuit for performing a method comprising:
  pre-setting customer district information according to which said customer requests distribution of information, said pre-setting including selecting a matching table of a plurality of matching tables, each matching table of the plurality of matching tables indicating multiple conditions to be met before disaster information is to be forwarded to customers selecting that matching table, the multiple conditions comprising at least one geographic condition of a plurality of geographic conditions and at least one disaster level condition of a plurality of disaster level conditions;
  receiving disaster-occurred information and identifying a disaster-occurred district and a level of said disaster;
  using the customer selected matching table in deciding whether to distribute information related to said disaster to said customer based on the at least one geographic condition compared with said disaster-occurred district and the at least one disaster level condition compared with said disaster level;
  distributing to said customer said disaster information responsive to the deciding that both the at least one geographic condition and the at least one disaster level condition are met by the disaster; and
  wherein said disaster relates to a railway course.

8. The computer program product of claim 7, wherein the information distribution apparatus further comprises a course-district conversion table which includes information on geographical districts passed by the railway course, and wherein the identifying said disaster-occurred district comprises employing said course-district conversion table to identify from said disaster-occurred information said disaster-occurred district.

9. The computer product of claim 8, wherein the course-district conversion table comprises a railway course affected by the disaster, and a first station and a second station denoting stations in which or between which the disaster has occurred.

* * * * *